US011879606B2

(12) United States Patent
Herman et al.

(10) Patent No.: US 11,879,606 B2
(45) Date of Patent: Jan. 23, 2024

(54) REINFORCED LIGHT STRIP FOR A LIGHTING DEVICE

(71) Applicant: Robert Bosch GmbH, Stuttgart (DE)

(72) Inventors: Gregory Herman, Elk Grove Village, IL (US); Jeremy Rubens, Pallatine, IL (US); Caitlyn Miklasz, Chicago, IL (US); Bradley Padget, Huntley, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/550,837

(22) Filed: Dec. 14, 2021

(65) Prior Publication Data

US 2023/0184398 A1 Jun. 15, 2023

(51) Int. Cl.

| | |
|---|---|
| ***F21S 4/24*** | (2016.01) |
| ***F21S 4/20*** | (2016.01) |
| ***F21V 21/32*** | (2006.01) |
| ***F21S 4/22*** | (2016.01) |
| *F21Y 115/10* | (2016.01) |
| *F21Y 103/10* | (2016.01) |

(52) U.S. Cl.

CPC . *F21S 4/24* (2016.01); *F21S 4/20* (2016.01); *F21S 4/22* (2016.01); *F21V 21/32* (2013.01); *F21Y 2103/10* (2016.08); *F21Y 2115/10* (2016.08)

(58) Field of Classification Search

CPC ....... F21S 4/20; F21S 4/22; F21S 4/24; F21V 21/32

See application file for complete search history.

(56) References Cited

U.S. PATENT DOCUMENTS

| | | | | |
|---|---|---|---|---|
| 9,115,858 | B2 | 8/2015 | Levante et al. | |
| 9,671,075 | B2 | 6/2017 | Greene | |
| 9,841,152 | B2 | 12/2017 | Stafford | |
| 9,867,239 | B2 | 1/2018 | Xiong et al. | |
| 10,520,143 | B1 * | 12/2019 | Findlay | F21V 31/04 |
| 10,690,300 | B2 | 6/2020 | Whiting et al. | |

(Continued)

FOREIGN PATENT DOCUMENTS

| | | |
|---|---|---|
| CN | 207421861 | 5/2018 |
| CN | 210717059 | 6/2020 |
| GB | 2583493 | 11/2020 |

OTHER PUBLICATIONS

GB Search Report for Application No. GB2218871.8 dated Jun. 9, 2023.

*Primary Examiner* — Evan P Dzierzynski
*Assistant Examiner* — Nathaniel J Lee
(74) *Attorney, Agent, or Firm* — Kelly McGlashen; Maginot, Moore & Beck LLP

(57) ABSTRACT

A flexible light assembly includes an elongated light transmissible jacket, the jacket including an internal vacancy. The assembly includes a substrate disposed in the internal vacancy. The substrate supports light emitters on a first surface thereof, and includes a reinforcing layer that is fixed to a surface the substrate opposite the first surface. The jacket may also include reinforcing fibers. The flexible light assembly is sufficiently flexible to permit bending such that the flexible light assembly can assume a radius of curvature in a range of 1.3 centimeters to 10.2 centimeters.

18 Claims, 8 Drawing Sheets

(56) References Cited

U.S. PATENT DOCUMENTS

| | | | | |
|---|---|---|---|---|
| 2014/0313721 | A1* | 10/2014 | Morgan | F21S 4/28 362/249.03 |
| 2014/0334142 | A1* | 11/2014 | Levante | F21S 4/22 362/222 |
| 2015/0260361 | A1 | 9/2015 | Cho | |
| 2015/0292721 | A1* | 10/2015 | Lesmeister | F21L 4/08 362/555 |
| 2016/0258607 | A1 | 9/2016 | Carton | |
| 2018/0245754 | A1* | 8/2018 | Gensler | F21V 3/10 |
| 2020/0053875 | A1* | 2/2020 | Holec | H05K 1/0298 |
| 2020/0149716 | A1* | 5/2020 | Collado | F21S 4/28 |

* cited by examiner

REINFORCED LIGHT STRIP FOR A LIGHTING DEVICE

BACKGROUND

Portable work lights are used to provide lighting in environments where work needs to be done. As used herein, the term portable refers to being movable being easily lifted and moved from place to place in a single hand of a user. Portable work lights may include a housing which holds a light source and often include an adjustable stand to help direct the light to the desired location. The light source may be an incandescent bulb, a light emitting diode (LED), or an LED pane, which often provides a point-source, or nearly-point source, of high intensity light. This type of light often produces shadows when directed at a complex and crowded target as when used to illuminate a vehicle engine bay or under a sink to illuminate a drainpipe. In some cases, the bright point-source light can also distract the user because the light may shine directly in their eyes or reflect off nearby surfaces. For at least these reasons, it is desirable to provide a work light that is portable, provides high light output and is a distributed light source.

SUMMARY

The work light is portable and wireless. The work light includes an elongate flexible light assembly that is stowable in a durable housing, for example by winding the assembly on a spool provided in the housing. The housing is generally disc-shaped and is at least partially light transmissible. The flexible light assembly is a structurally reinforced light strip that can emit light along its entire length.

The work light can assume multiple configurations so as to be adaptable to different work environments which may have correspondingly different lighting requirements. For example, during storage and for ease of portability, the flexible light assembly can be fully retracted into the housing. The flexible light assembly can be powered while in the fully retracted configuration, whereby light is emitted from the light-transmissible portions of the housing. In this configuration, the work light is a source of diffused light, providing general lighting in a manner similar to that of a traditional work light. In other configurations, the flexible light assembly can be extended relative to the housing. In these configurations, both the housing and the flexible light assembly emit light, whereby the housing and the flexible light assembly cooperate to provide an elongated distributed light source.

In some embodiments, the distal end of the flexible light assembly may terminate in a spotlight. The spotlight emits a relatively high intensity and focused light as compared to the flexible light assembly. Since the spotlight is disposed at an end of the flexible light assembly, when the work light is in the extended configuration, the spotlight can be easily directed as needed, and can be inserted in tight spaces to provide task lighting. When the work light is in the retracted configuration, the spotlight may be received in a recess of the housing so that the work light maintains a clean appearance and/or low profile. In the retracted configuration, the spotlight can be directed as needed by appropriate placement of the housing.

In other embodiments, the distal end of the flexible light assembly may terminate in a hook that can be used to suspend the work light from convenient structures. The work light may be supported by the hook, or alternatively a flat surface of the housing may rest on a support surface. The housing may also include a foot that is stowed in a recess of the housing. The foot can be folded out to serve as a stand that allows the housing to be oriented on an edge surface thereof. In the folded-out configuration, the foot may alternatively serve as a hanger by which the housing may be suspended.

The work light provides widely dispersed light that minimizes shadows in cluttered areas. The flexible light assembly itself provides a distributed light that is less intense per unit area compared to a typical work light, reducing glare and reflections.

In some embodiments, the flexible light assembly includes a light strip in which light emitters, for example LEDs, and other supporting electronic devices are distributed along a surface of a substrate. The electronic devices may include, for example, resistors. The substrate is in the form of a very thin, flexible conductive strip or film. For example, the substrate may be very thin, approximately 0.1 mm to 0.5 mm in thickness, and may be made of metal such as copper or other conductive material. The substrates, when unsupported, may be fragile, especially in tensile strength, and repetition, side bend, and twist resistance. The substrate may tear or crease, or the non-flexible components including the light emitters and resistors, may become damaged or dislodged. The light strips also lack tensile strength in the direction of elongation. For this reason, in the flexible light assembly, the substrate is reinforced. For example, the substrate is provided with a reinforcing layer on a side opposed to the light emitters. The reinforcing layer may be a flexible strip of metal or plastic that is a backing for the substrate. The reinforcing layer is a strengthening member that can carry the strain the tensile direction while also resisting off axis bending and twisting.

The substrate, reinforcing layer and light emitters are enclosed within a flexible waterproof jacket that also acts as a light guide. The jacket may be made of silicone but could also be other flexible and transparent materials. The jacket itself may be further reinforced. For example, in some embodiments, the jacket may include embedded fibers or cords to provide additional strength.

In some embodiments, the housing for the work light is an elongated, flexible exoskeleton. In this embodiment, the flexible light assembly, including the substrate, the reinforcing layer and the light emitters, which are enclosed in the flexible, waterproof jacket, are disposed in flexible elongated housing that serves as a superstructure surrounds the flexible light assembly along substantially its entire length. The exoskeleton can take two forms: The first form is a single strengthening body adhered to the outside of the flexible light assembly to offer similar benefits to an internal rigid icing member. The second form is a segmented or hinged assembly that flexes about one axis. The segments, serially connected by hinges, would allow flexing in one direction, but would resist movements in off-axis directions, twisting or tensile directions.

In some aspects, a flexible light assembly includes an assembly first end, an assembly second end that is opposite the assembly first end and an assembly centerline that extends between the assembly first end and the assembly second end. The flexible light assembly includes an assembly thickness dimension, an assembly width dimension that is measured in a direction perpendicular to the assembly thickness dimension and an assembly length dimension. The assembly length dimension is measured in a direction parallel to the assembly centerline. The assembly length dimension is perpendicular to the assembly thickness dimension and the assembly width dimension. The assembly length dimension is at least ten times the assembly thickness dimension and the assembly width dimension. The flexible light assembly includes a jacket that has a jacket first end that coincides with the assembly first end, and a jacket second end that coincides with the assembly second end. The jacket has an internal vacancy that is elongated in a direction parallel to the assembly centerline. The flexible light assembly includes a substrate that is elongated in a direction parallel to the assembly centerline, the substrate being disposed in the internal vacancy. The substrate is formed of a first material. The first material is at least as flexible as the jacket. The substrate includes a substrate thickness dimension, a substrate width dimension that is measured in a direction perpendicular to the substrate thickness dimension and a substrate length dimension that is measured in a direction parallel to the assembly centerline. The substrate length dimension is perpendicular to the substrate thickness dimension and the substrate width dimension. The substrate length dimension is at least ten times the substrate thickness dimension and the substrate width dimension. The substrate includes a substrate first surface that is parallel to the substrate length dimension and the substrate width dimension, and a substrate second surface that is opposite the substrate first surface. The flexible light assembly includes light emitters that are disposed on the substrate first surface. The light emitters are spaced apart in a direction parallel to the assembly centerline. The flexible light assembly includes a reinforcing layer that is fixed to the substrate second surface and is formed of a second material. The second material has a greater tensile strength than the first material. The flexible light assembly is sufficiently flexible to permit the assembly first end to deflect relative to the assembly second end about an axis perpendicular to the assembly centerline such that the assembly centerline can assume a radius of curvature in a range of 1.3 centimeters to 10.2 centimeters.

In some embodiments, the jacket is formed of a third material that includes embedded reinforcing fibers.

In some embodiments, the jacket provides a waterproof enclosure for the substrate, the light emitters and the reinforcing layer.

In some embodiments, the jacket is formed of a third material that is light transmissive.

In some embodiments, the jacket includes light transmissive portions.

In some embodiments, the jacket is opaque in a direction perpendicular to the first and second surfaces and is light transmissive in a direction parallel to the first and second surfaces.

In some embodiments, the jacket is opaque in a direction parallel to the first and second surfaces and is light transmissive in a direction perpendicular to the first and second surfaces.

In some embodiments, the reinforcing layer is fixed to the second surface via an adhesive.

In some embodiments, the substrate is electrically conductive and is configured to provide an electrical connection between each light emitter and a power supply.

In some embodiments, the flexible light assembly is sufficiently flexible to permit the assembly first end to deflect relative to the assembly second end about an axis perpendicular to the assembly centerline such that the assembly centerline can assume a radius of curvature of 5.1 centimeters.

In some embodiments, the assembly second end terminates in a spotlight.

In some embodiments, the spotlight and the light emitters are powered by a common power supply via the substrate.

In some embodiments, the flexible light assembly includes a superstructure that encloses the flexible light assembly, the superstructure including a plurality of serially-connected and hollow segments, the segments being rotatable relative to each other about axes that are parallel to the width of the substrate.

In some embodiments, the segments are light transmissible.

In some embodiments, each segment includes an opening that permits transmission of light therethrough.

In some aspects, a flexible light assembly includes a light strip having an elongate substrate. The flexible light assembly includes light emitters that are supported on a first surface of the substrate and powered by a power supply via the substrate. The flexible light assembly includes a reinforcing a reinforcing layer that is fixed to a second surface of the substrate, the reinforcing layer having a greater tensile strength than that of the substrate. In addition, the flexible light assembly includes a jacket that provides a waterproof enclosure for the light strip and the reinforcing layer, at least a portion of the light strip being one of translucent or transparent.

In some embodiments, the flexible light assembly is sufficiently flexible to permit a first end of the jacket to deflect relative to a second end of the jacket about an axis that is parallel to the first surface of the substrate such that the flexible light assembly can assume a radius of curvature in a range of 1.3 centimeters to 10.2 centimeters.

In some embodiments, the jacket is formed of a fiber-reinforced silicon.

In some embodiments, one end of the flexible light assembly includes a hook.

In some embodiments, one end of the flexible light assembly includes a light source.

DETAILED DESCRIPTION

Figure 1:
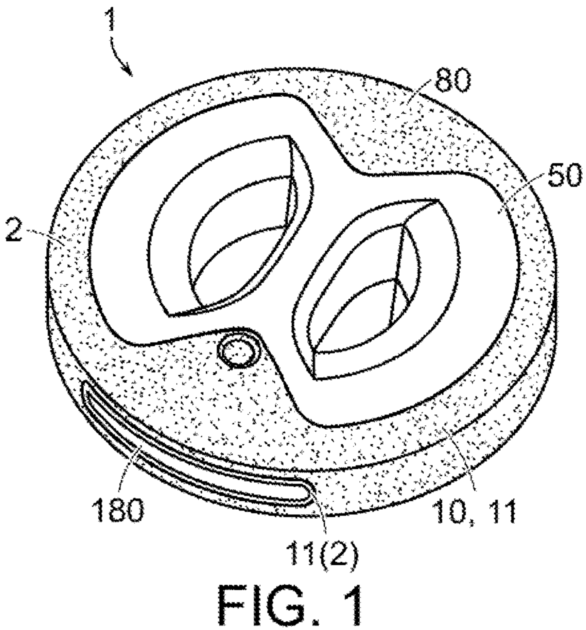
FIG. 1 is a perspective view of a lighting device in a first configuration. In this figure, stippling is used to show opaque portions of the device, and portions of the device without stippling are light transmissive.

Referring to FIGS. 1-9, a portable, wireless lighting device 1, 201 includes a housing 2, and a flexible light assembly 100. The flexible light assembly 100 is an elongated, flexible strip that resembles a tape or ribbon, and includes light emitting elements such as LEDs that are distributed along a length thereof, whereby the flexible light assembly 100 provides the light source for the lighting device 1, 201. The housing 2 includes light transmissive portions. In addition, the flexible light assembly 100 may be stored or operated in a retracted configuration in which the flexible light assembly 100 is coiled inside the housing 2, or alternatively may be operated in an extended configuration in which the flexible light assembly 100 protrudes from the housing 2. Because lighting device 1, 201 is capable of assuming multiple configurations that provide general lighting, task lighting or both, the lighting device 1, 201 is ideally suited to serve as a work light that is able to accommodate the lighting requirements of various work environments. Details of the configurability of the lighting device 1, 201 are described below. In addition, the flexible light assembly 100 includes structurally reinforcing features that provide a reliable and durable light strip, including when used in various work environments. Details of the flexible light assembly 100 including the structural reinforcing features are described below.

The housing 2 of the lighting device 1, 201 is rigid, generally disc shaped, and has a size and weight that permits the housing 2 to be easily lifted and moved from place to place in a single hand of a user. The housing 2 includes a stator 10, and a rotor 50 that is rotatably supported on the stator 10.

Figure 12:
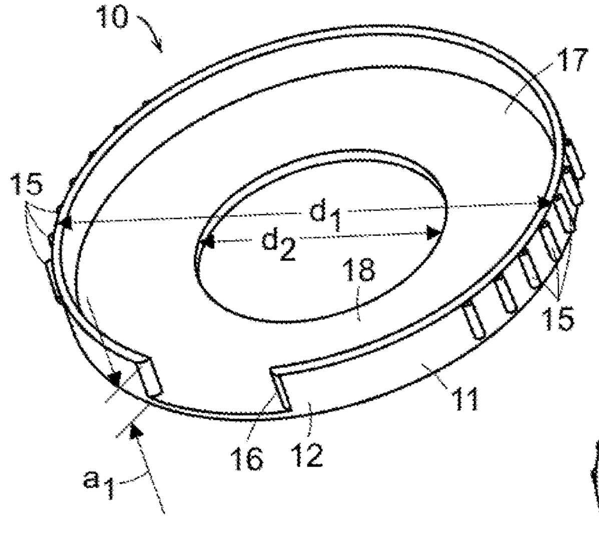
FIG. 12 is a first perspective view of the stator of the housing.
Figure 13:
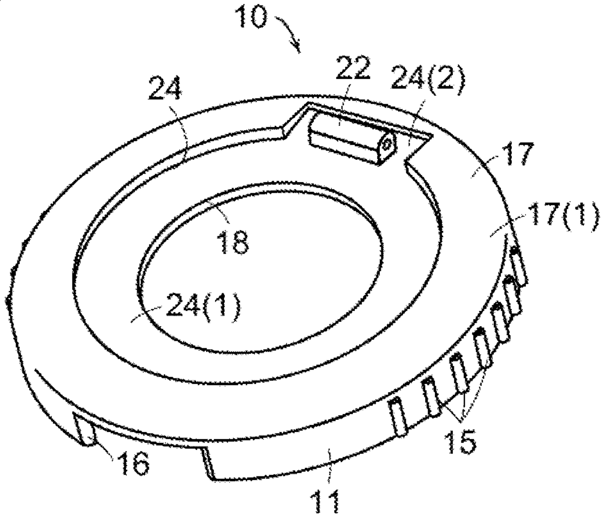
FIG. 13 is a second perspective view of the stator of the housing.
Figure 14:
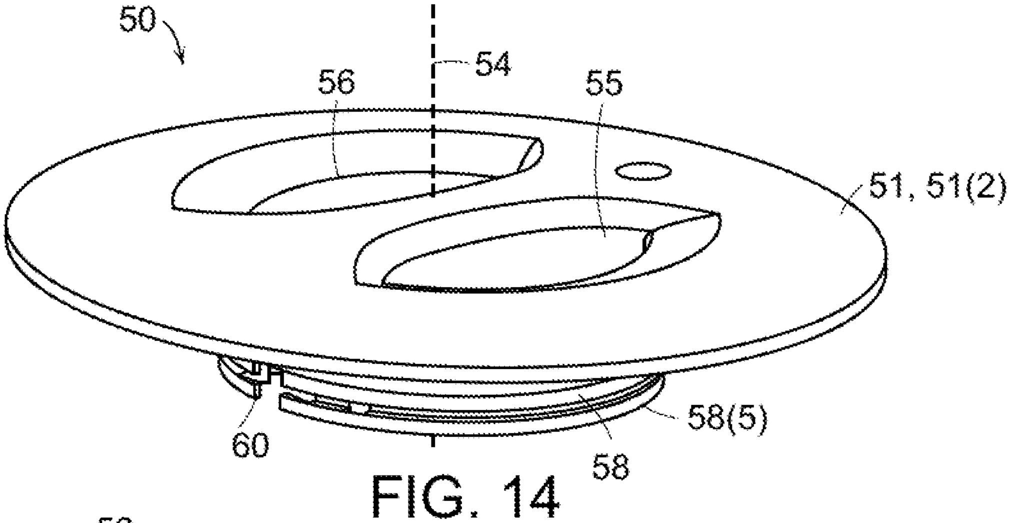
FIG. 14 is a first perspective view of the rotor of the housing.
Figure 15:
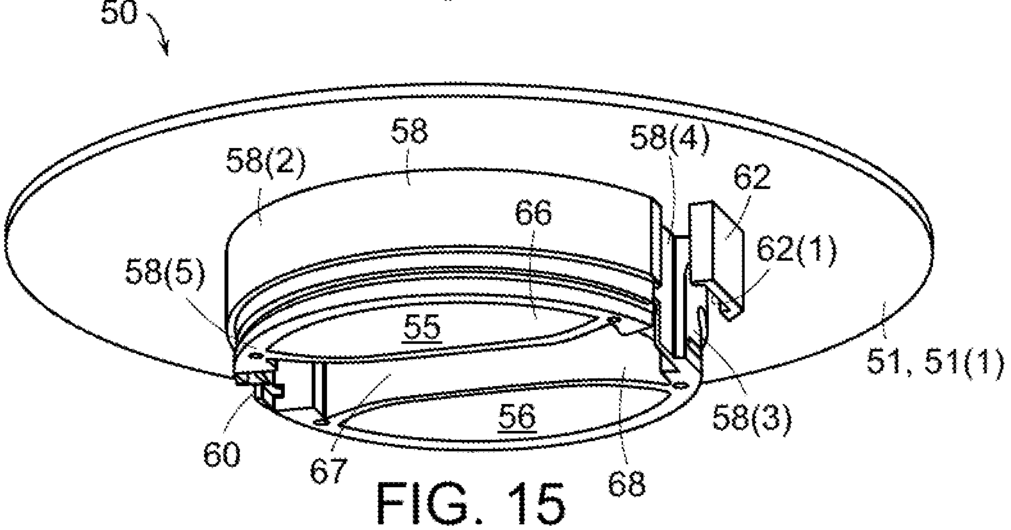
FIG. 15 is a second perspective view of the rotor of the housing.
Figure 16:
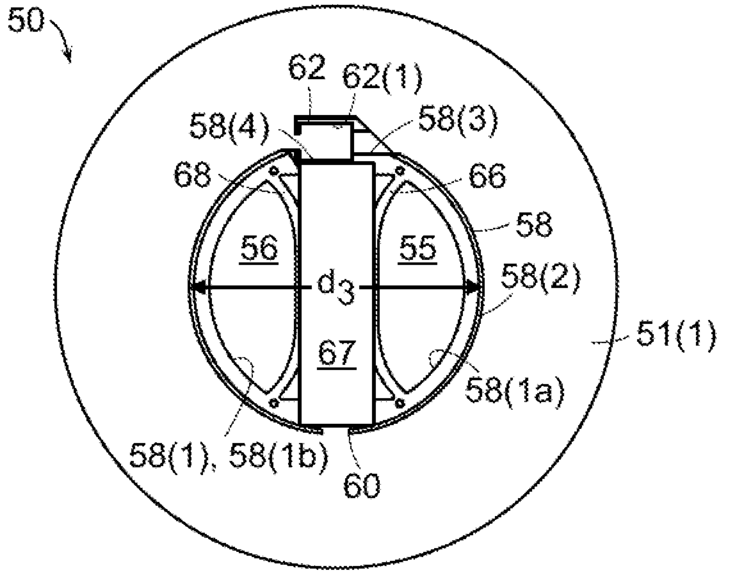
FIG. 16 is an end view of the rotor of the housing.
Figure 17:
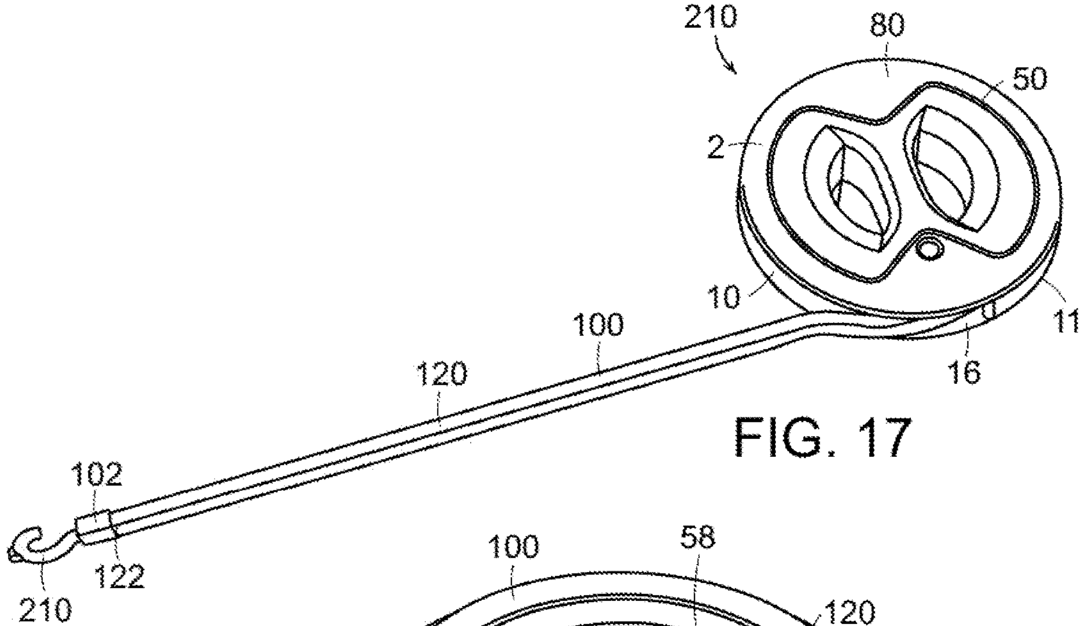
FIG. 17 is a front perspective view of the of the lighting device of FIG. 3, shown with the flexible light assembly in an extended configuration.
Figure 18:
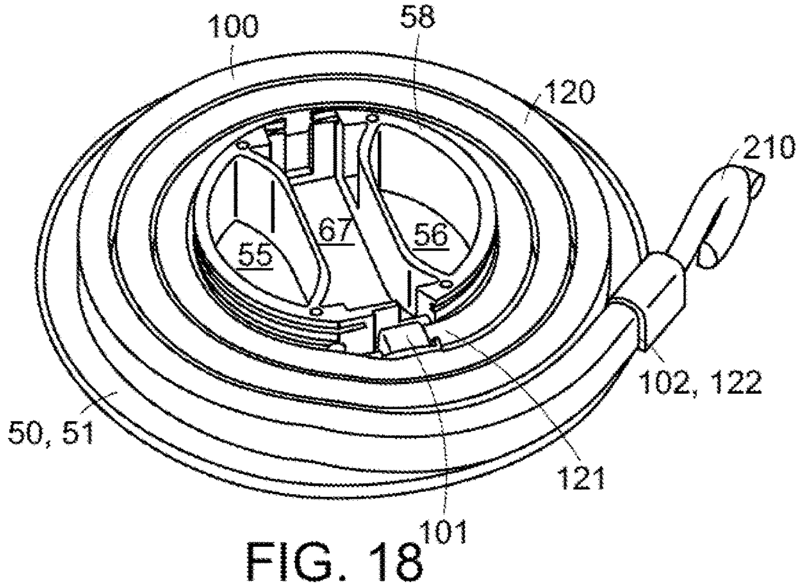
FIG. 18 is a rear perspective view of the of the lighting device of FIG. 3, shown with the stator and battery cover omitted and with the flexible light assembly in a retracted configuration.

Referring also to FIGS. 12 and 13, the stator 10 includes a circular sidewall 11 that surrounds a centerline 14 of the stator 10. The stator 10 includes a stator endwall 17 that closes a first end 12 of the sidewall 11. Together, the sidewall 11 and the stator endwall 17 provide the stator 10 with the shape of a shallow cup. In addition to the sidewall 11 and the endwall 17, the stator 10 also includes a foot 26 that is movable between folded and expanded configurations, and when arranged in the expanded configuration, the foot 26 is used to support the housing 2 in an upright orientation.

The stator 10 is low in profile in that an axial dimension a1 of the sidewall 11 is small relative to a diameter d1 of the sidewall 11. For example, in the illustrated embodiment, the sidewall axial dimension a1 is about one-tenth of the sidewall diameter d1.

The sidewall 11 includes a sidewall opening 16 that provides passage between an interior space 3 of the housing 2 and the environment of the lighting device 1, 201. The sidewall opening 16 is sufficiently large to permit passage of the flexible light assembly 100 therethrough.

The stator endwall 17 includes a central opening 18 that is centered on the stator centerline 14. The central opening 18 is large relative to the size of the stator endwall 17. For example, in the illustrated embodiment, the central opening 18 has a diameter d2 that is approximately one half the sidewall diameter d1, where the sidewall diameter d1 corresponds to a diameter of the stator endwall 17.

Figure 2:
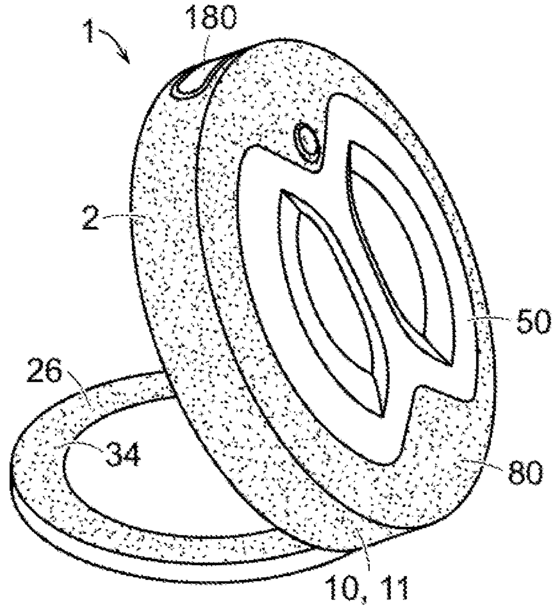
FIG. 2 is a perspective view of the lighting device of FIG. 1 in a second configuration. In this figure, stippling is used to show opaque portions of the device, and portions of the device without stippling are light transmissive.

An outward-facing surface 17(1) of the endwall 17 may include a recess 24 that surrounds the central opening 18. The recess 24 has a profile corresponding to a peripheral shape of the foot 26 that is hingedly attached to the stator outward-facing surface 17(1). In the illustrated embodiment, in which the foot 26 has the form of a flattened ring, the profiles of the foot 26 and of the recess 24 are generally circular. More particularly, the recess 24 includes a circular portion 24(1) that receives the foot 26, and a rectilinear portion 24(2) that accommodates a hinge block 22 used to receive a pin (not shown) that connects a proximal end 32 of the foot 26 to the endwall 17. The recess 24 is of sufficient depth to fully or substantially fully receive the foot 26 therein when the foot 26 is in a folded configuration. When the foot 26 is in an unfolded configuration, a distal end 34 of the foot 26 is spaced apart from the stator endwall 17. When housing 2 is supported on a horizontal surface via the folded foot 26 (as shown in FIG. 1), the lighting device 1, 201 may be operated in horizontal orientation. When the housing is supported on a horizontal surface via the unfolded foot 26 (as shown in FIG. 2), the lighting device 1, 201 may be operated in a vertical, or upright, orientation.

An outward-facing surface 11(1) of the sidewall 11 may include protruding shallow, linear ribs 15. The ribs 15 are spaced apart along a circumference of the sidewall 11 and extend in a direction parallel to the stator centerline 14. In some embodiments, the ribs 15 provide a roughened surface texture to the stator 10, enhancing the ability of a user to manually grip the stator.

The stator 10 is opaque. As used herein, the term "opaque" refers to permitting no light transmission or substantially no light transmission. The term "substantially no light transmission" refers to permitting, at maximum, transmission of light in a range of zero to three percent of light emitted. Although in the illustrated embodiment, the stator 10 is formed of a tough, durable plastic suitable for injection molding, any suitable material may be used to form the stator 10.

Referring to FIGS. 6-11 and 14-16, the rotor 50 includes rotor endwall 51 and a spool 58 that protrudes from an inward-facing surface 51(1) of the rotor endwall 51. The spool 58 is a hollow cylinder and has an outer diameter d3 that permits the spool 58 to protrude through the central opening 18 of the stator 10 in a sliding fit. The spool 58 is centered on the stator centerline 14, and rotation of the rotor 50 relative to the stator 10 results in a corresponding rotation of the spool 58 about a rotational axis 54 that is coincident with the stator centerline 14. The spool 58 has an axial dimension a2 (e.g., a dimension in a direction parallel to the rotational axis 54) that is equal to or slightly greater than an axial dimension of the stator 10.

The hollow interior space of the spool 58 is segregated into three separate regions via a first interior wall 66 and a second interior wall 68. The first and second interior walls 66, 68 are non-intersecting. The first and second interior walls 66, 68 are each slightly curved, and a central space 67 exists between the first interior wall 66 and the second interior wall 68. In use, the central space 67 between the first and second interior walls 66, 68 receives a power supply of the lighting device 1, 201, in the form of a battery 90, as discussed in detail below.

The rotor endwall 51 includes a pair of finger openings 55, 56 that are located in the area circumscribed by an inner surface 58(1) of the spool 58. A first finger opening 55 of the pair of finger openings 55, 56 is defined between the first interior wall 66 and a first portion **58(1*a*) of the spool inner surface 58(1). Likewise, a second finger opening 56 of the pair of finger openings 56 is defined between the second interior wall 68 and a second portion 58(1*b*) of the spool inner surface 58(1). The first and second finger openings 55, 56 are elongated when viewed in a direction perpendicular to the rotational axis 54 and may be dimensioned to receive a tip of a user's fingers. The first and second finger openings 55, 56 may be grasped by the fingers of a user when rotating the rotor 50 relative to the stator 10**.

The spool 58 includes an axial slit 60 at a location that intersects with the central space 67. At a location diametrically opposed to the slit 60, an outer surface 58(2) of the spool 58 includes a flat 58(3). The rotor includes a fence 62 that protrudes inward from the rotor endwall inward-facing surface 51(1). The fence 62 is parallel to the flat 58(3), and closely spaced therewith. The facing surfaces of the flat 58(3) and the fence 62 included mirroring recesses 58(4), 62(1) which are shaped and dimensioned to receive and retain a first end 101 of the flexible light assembly 100. By this configuration, the flat 58(3) and the fence 62 cooperate to connect the first end 101 of the flexible light assembly 100 to the spool. In the illustrated embodiment, the first end 101 of the flexible light assembly 100 is slightly enlarged relative to the remainder of the flexible light assembly 100 so as to facilitate this connection.

Rotation of the rotor 50 relative to the stator 10 in one direction results in winding of the flexible light assembly 100 onto the spool 58, as well as retraction of the flexible light assembly 100 into the housing 2. Rotation of the rotor 50 relative to the state or 10 in an opposite direction results in unwinding of the flexible light assembly 100 from the spool 58, as well as advancement of the flexible light assembly 100 out of the housing 2.

The rotor 50 is formed of a light transmissible material. In some embodiments, the material used to form the rotor 50 is translucent. As used herein, the term "translucent" refers to transmitting and diffusing light so that bodies lying beyond the material cannot be seen clearly. In other embodiments, the material used to form the rotor 50 is transparent. As used herein, the term "transparent" refers to having the property of transmitting light without appreciable scattering so that bodies lying beyond the material are seen clearly. Although in the illustrated embodiment, the rotor 50 is formed of a tough, durable plastic suitable for injection molding, any suitable material having desired light transmission properties may be used to form the rotor 50.

Because the rotor 50 is light transmissible, and because at least a portion of the flexible light assembly 100 is always disposed in the housing interior space 3 defined between the stator 10 and the rotor 50, the housing 2 serves as a light source when the flexible light assembly is powered.

Figure 10:
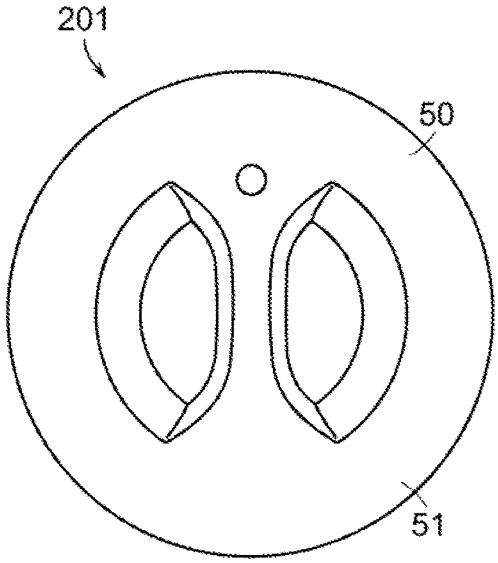
FIG. 10 is a front view of the lighting device of FIG. 3, shown with the overmolded element omitted.
Figure 11:
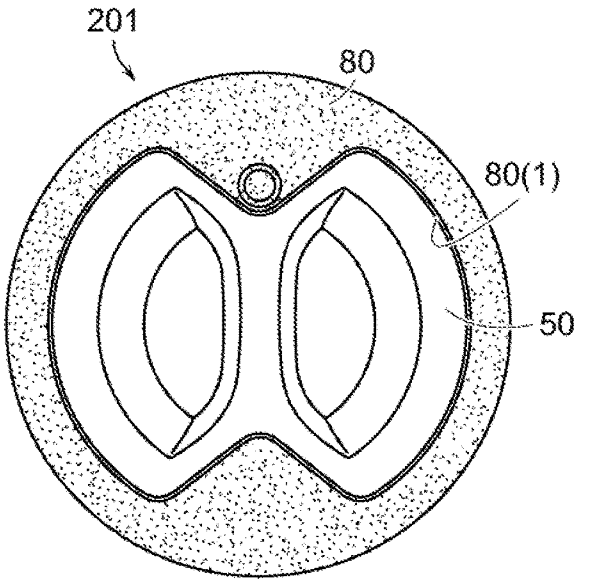
FIG. 11 is a front view of the lighting device of FIG. 3, shown with the overmolded element included. In this figure, stippling is used to show opaque portions of the device, and portions of the device without stippling are light transmissive.

Referring to FIGS. 10 and 11, in the illustrated embodiment, the housing 2 includes an overmolded element 80 that overlies a peripheral portion of the outward-facing surface 51(2) of rotor endwall 51, as well as a peripheral edge 51(3) of the of the rotor endwall 51. The overmolded element 80 may be attached to the rotor 50 via a snap-fit or other conventional connection method. In some embodiments, the overmolded element 80 may be used to protect the rotor 50 from impact. In other embodiments, the overmolded element 80 may have a contrasting color and or level of light transmissivity relative to the rotor 50 and may be used to provide added interest to the appearance to the housing 2. To this end, an inner peripheral edge 80(1) of the overmolded element 80 may have an irregular and/or curvilinear shape.

Referring to FIGS. 6-9, the lighting device 1, 201 includes the battery 90 that supplies power to the flexible light assembly 100. The battery 90 is housed within a battery holder 92, which in turn is disposed in the central space 67 defined in the spool 58 between the first and second interior walls 66, 68. The battery holder 92 may also house a control switch (not shown), a printed circuit board (not shown) and/or power control electronics (not shown). Thus, the battery 90 and corresponding electronics are housed in the central space 67 of the spool 58, which in turn is integrally formed with the rotor 50. As a result, the battery 90 and corresponding electronics rotate with the spool 58, avoiding the need to pass electricity or signals between two rotating bodies. In addition, this configuration allows for a more compact housing 2.

The control switch may be a simple on/off switch, or may alternative be a multi-mode selection switch that permits selection between a "power off" mode and various "power on" modes. The various power on modes may permit selection between one or more of a constant power on mode and various intermittent power on modes (fast blink, slow blink, etc.), and/or selection between power levels (high intensity, medium intensity, low intensity). The printed circuit board may be electrically connected to the power source via the control switch and may support the power control electronics and/or a "boost board" 94 that regulates voltage supplied to the flexible light assembly.

In use, the battery holder 92 is retained in the central space 67 by a battery cover 98. In some embodiments, the battery cover 98 is connected to the open end 58(5) of the spool 5S via fasteners such as screws (not shown). The battery cover 98 may include a switch opening 99 through which the control switch protrudes from the housing 2 and is accessible to a user.

Referring to FIGS. 17-21, the flexible light assembly 100 provides the light source for the lighting device 1, 201. The flexible light assembly 100 includes an assembly first end 101, and an assembly second end 102 that is opposite the assembly first end 101. The flexible light assembly 100 has an assembly centerline 103 that extends between the assembly first and second ends 101, 102.

The flexible light assembly 100 is elongated and has the form of a ribbon or tape. For example, the flexible light assembly 100 has a length dimension that is measured in a direction parallel to the assembly centerline 103. In the illustrated embodiment, the length dimension is at least ten times a width or thickness dimension of the flexible light assembly. In addition, in some embodiments, the ratio of the width to the thickness is 1:1. In other embodiments, the ratio of the width to the thickness is 2:1. In still other embodiments, the ratio of the width to the thickness is 5:1 or more. In one non-limiting example, the flexible light assembly may have a length of 0.30 meter or more, a width of 15 mm and a thickness of 5 mm.

The flexible light assembly 100 includes a substrate 110, and the light emitting elements 130 and ancillary electrical components 132 that are supported on the substrate 110. The flexible light assembly 100 includes a jacket 120 that encloses the substrate 110, the light emitting elements 130 and the ancillary electrical components 132. In addition, the flexible light assembly 100 includes structures 107, 140 that provide structural reinforcement thereof, as discussed in detail below.

Figure 19:
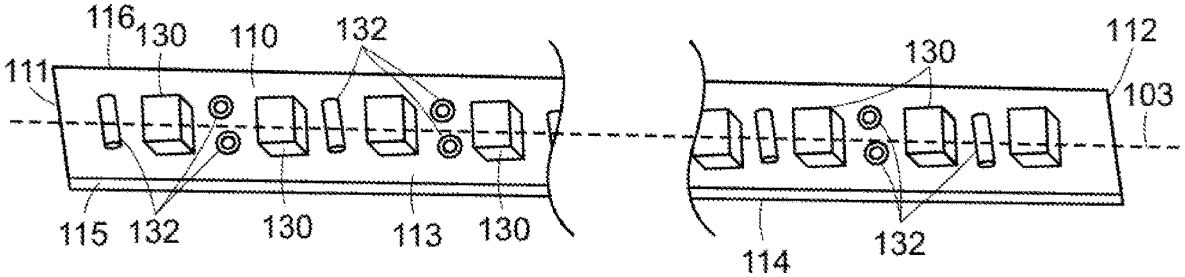
FIG. 19 is a perspective view of the substrate of the flexible light assembly.

The substrate 110 may be a very thin, electrically conductive strip or film (FIG. 19). For example, in some embodiments the substrate 110 is a copper strip. In other embodiments, the substrate 110 may be a flexible printed circuit board, which includes embedded electrical conductors that connect the light emitting elements 130 and the ancillary electrical components 132 to the battery and, in some embodiments, control circuitry.

The substrate 110 includes a first end 111, a second end 112 that is opposite the first end 111. The substrate 110 has a rectangular cross-sectional shape, and thus includes four sides. The four sides of the substrate 110 include a first side 113, and a second side 114 that is opposite the first side 113 and spaced apart from the first side 113 in a thickness direction of the substrate 110. The four sides of the substrate 110 also include a third side 115, and a fourth side 116 that is opposite the third side 115 and spaced apart from the third side 115 in a width direction of the substrate 110. The light emitters 130 and ancillary electronic devices such as resistors, etc., are disposed on the first side 113 of the substrate 110, as discussed in detail below.

The substrate 110 has proportions that are generally similar to those of the flexible light assembly 100. In particular, the substrate 110 has a length dimension that measured between the substrate first end 111 and the substrate second end 112, and that is much greater than its width or thickness. In the illustrated embodiment, the substrate may have a length of 0.30 meter or more, a width of 10 mm and a thickness of 0.1 mm to 0.5 mm. In the illustrated embodiment, the substrate first end 111 coincides with, or is closely adjacent to, the flexible light assembly first end 101, and the substrate second end 112 coincides with, or is closely adjacent to, the flexible light assembly second end 102.

Figure 20:
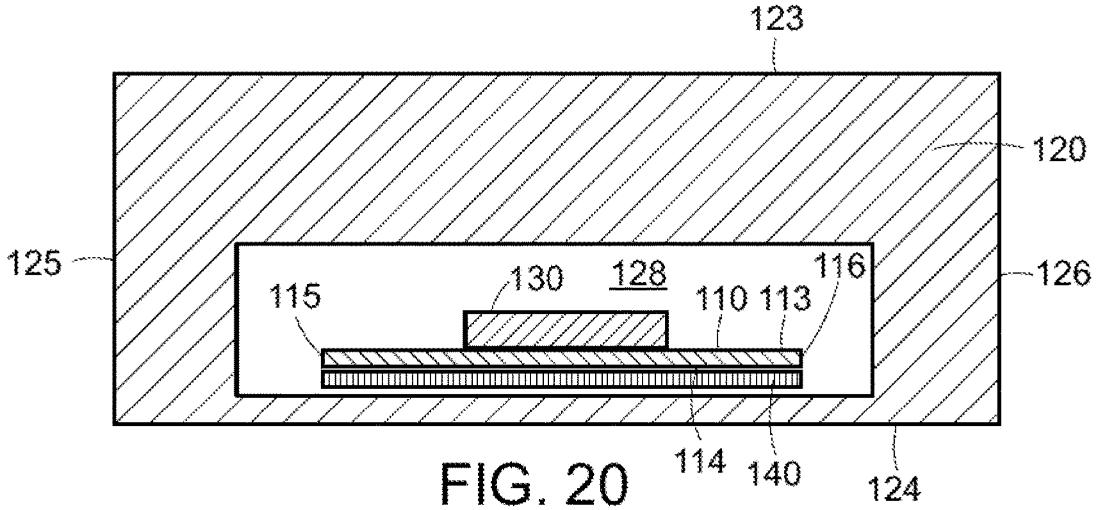
FIG. 20 is a cross-sectional view of the flexible light assembly.
Figure 21:
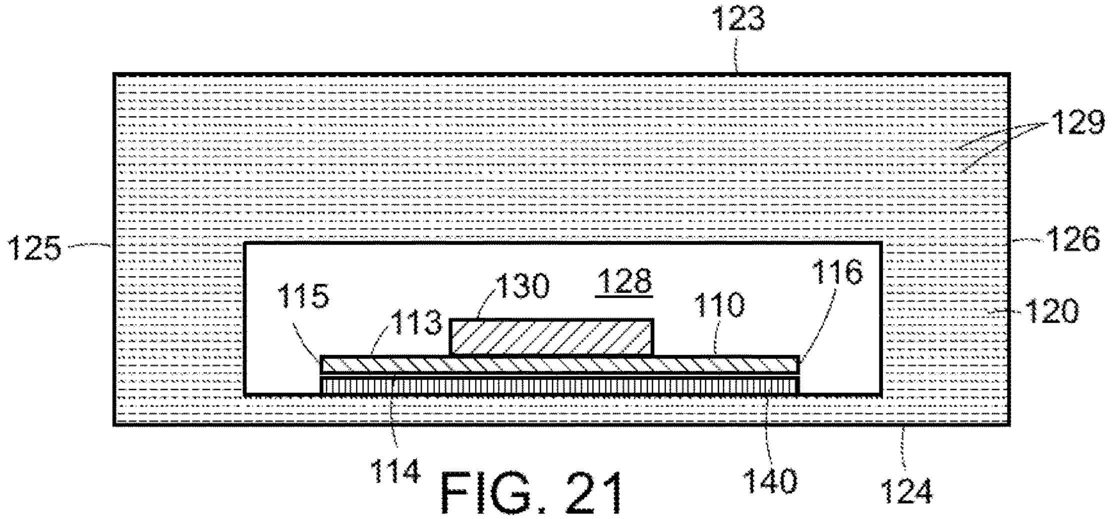
FIG. 21 is a cross-sectional view of the flexible light assembly illustrating an embodiment in which the jacket includes reinforcing fibers or cords.

Referring to FIGS. 20 and 21, in addition to being electrically conductive, the substrate 110 is very flexible. However due to its thinness, and, in some cases, due to its material properties, the substrate 110 lacks tensile strength, and may tear if twisted. To provide increased robustness, a reinforcing layer 140 is fixed to the second side 114 of the substrate 110, for example using an adhesive. The reinforcing layer 140 may have a length and width that correspond to the length and width of the substrate 110. The reinforcing layer 140 is formed of a higher strength material than that of the substrate 110. In the illustrated embodiment, the reinforcing layer 140 is formed of a very thin metal strip. In a non-limiting example, the reinforcing layer 140 may be a steel strip having a thickness of 0.1 mm. In other embodiments, the reinforcing layer 140 may be formed of plastic or a woven material. By providing the substrate 110 with a reinforcing layer 140 as a backing, the reinforcing layer 140 may can strain in the tensile direction, while also resisting off-axis bending and twisting.

The light emitters 130 are fixed to the substrate first side 113 and are electrically connected to the battery 90 via the substrate 110. In the illustrated embodiment, the light emitters 130 are LEDs, but are not limited to this type of light emitter.

Each of the light emitters 130 may, be employ one or more LEDs. In particular, the light emitters 130 may be provided as surface mounted LEDs, separate LED packages, or as a conventional LED housed in an epoxy lens/case. In some embodiments, the light emitter 130 may produce white light, whether using three individual. LEDs that emit three primary colors (i.e., red, green, and blue) or by coating the LEDs with a phosphor material. In other embodiments, the one or more of the LEDs may be RGB LEDs to create light in multiple different shades of color by selectively illuminating the LEDs to mix the colors.

The jacket 120 provides a flexible, watertight enclosure for the substrate 110, the light emitters 130 and the reinforcing layer 140. The jacket 120 includes a jacket first end 121 that coincides with the assembly first end 101, and a jacket second end 122 that coincides with the assembly second end 102.

The jacket 120 has a rectangular cross-sectional shape, and thus includes four sides. The four sides of the jacket 120 include a first side 123, and a second side 124 that is opposite the first side 123 and spaced apart from the first side 123 in a thickness direction of the jacket 120. The four sides of the jacket 120 also include a third side 125, and a fourth side 126 that is opposite the third side 125 and spaced apart from the third side 125 in a width direction of the jacket 120.

In addition, the jacket 120 includes an internal vacancy 128 that is elongated in a direction parallel to the assembly centerline 103. In some embodiments, the internal vacancy 128 extends between the jacket first and second ends 121, 122. The substrate 110, the reinforcing layer 140 and the light emitters 130 elements are disposed in the internal vacancy 128 in such a way that the substrate first side 113 faces toward the jacket first side 123, the substrate second side 114 faces toward the jacket second side 124, and the reinforcing layer 140 is disposed between the substrate 110 and the jacket second side 124.

Figure 3:
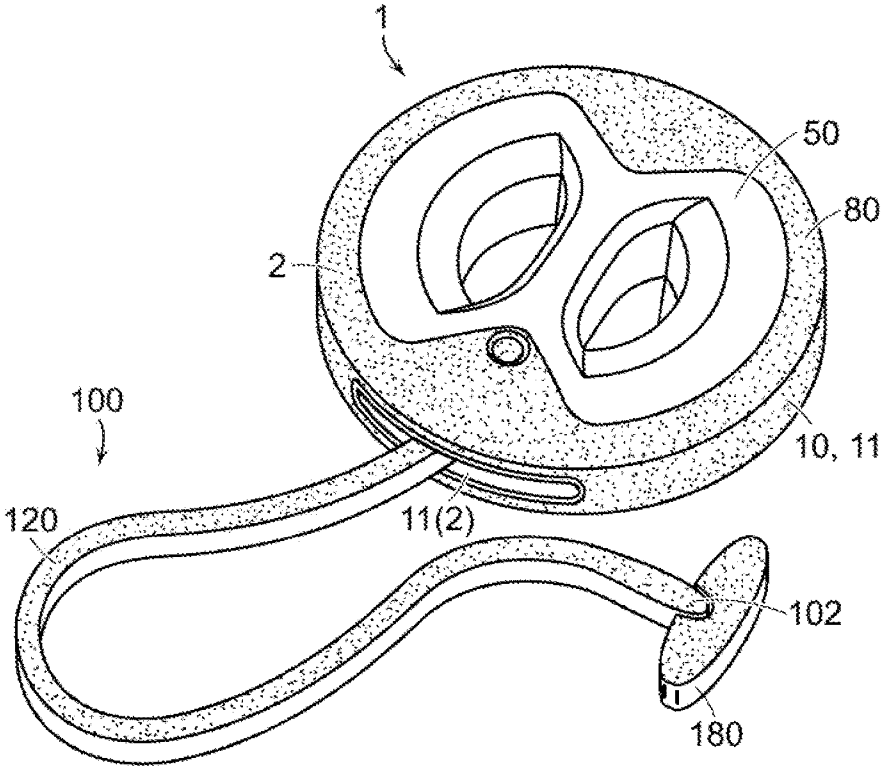
FIG. 3 is a perspective view of the lighting device of FIG. 1 in a third configuration. In this figure, stippling is used to show opaque portions of the device, and portions of the device without stippling are light transmissive.
Figure 4:
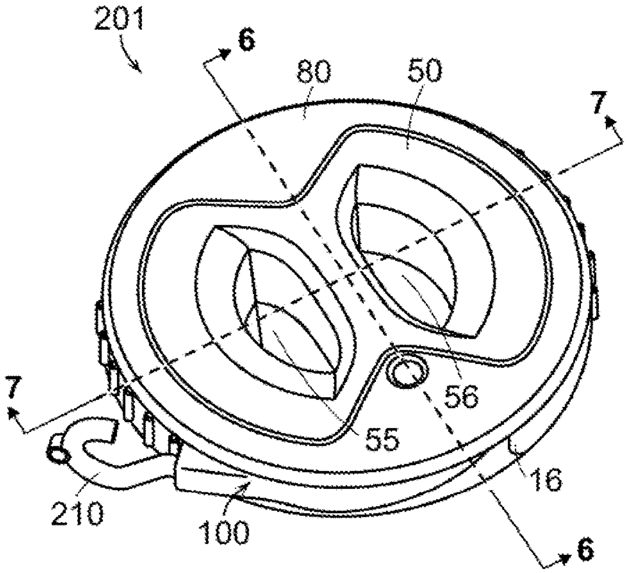
FIG. 4 is a front perspective view of an alternative embodiment lighting device.
Figure 5:
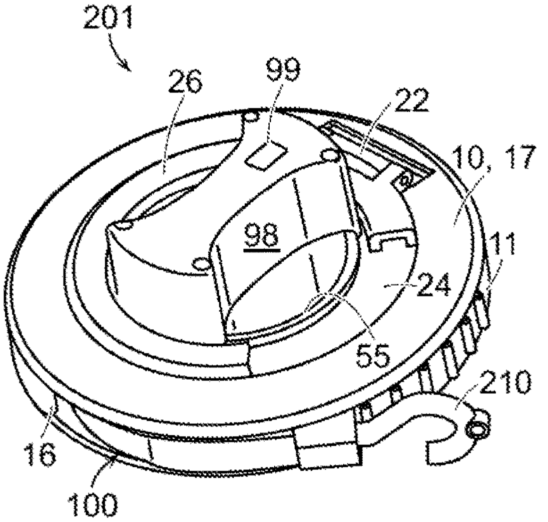
FIG. 5 is a rear perspective view of the lighting device of FIG. 3.
Figure 6:
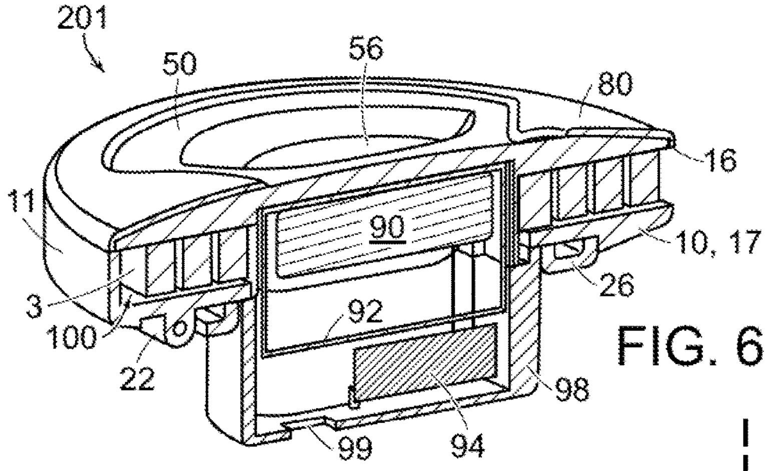
FIG. 6 is a cross-sectional view of the lighting device of FIG. 3 as seen along line 6-6 of FIG. 4.
Figure 7:
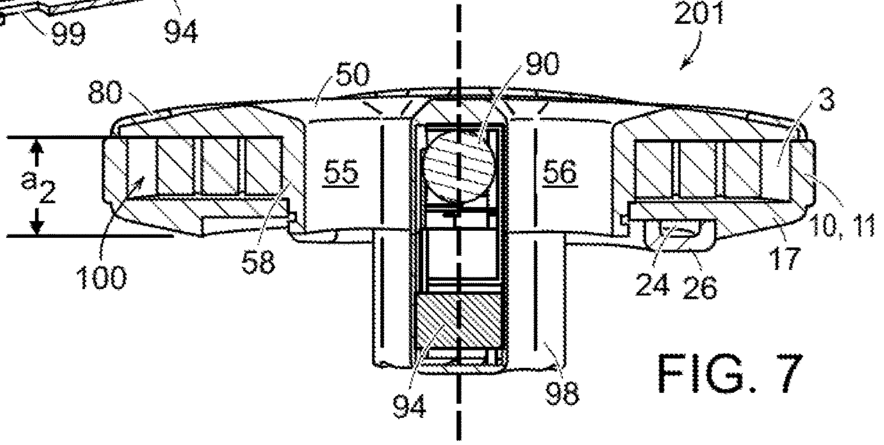
FIG. 7 is a cross-sectional view of the lighting device of FIG. 3 as seen along line 7-7 of FIG. 4.
Figure 8:
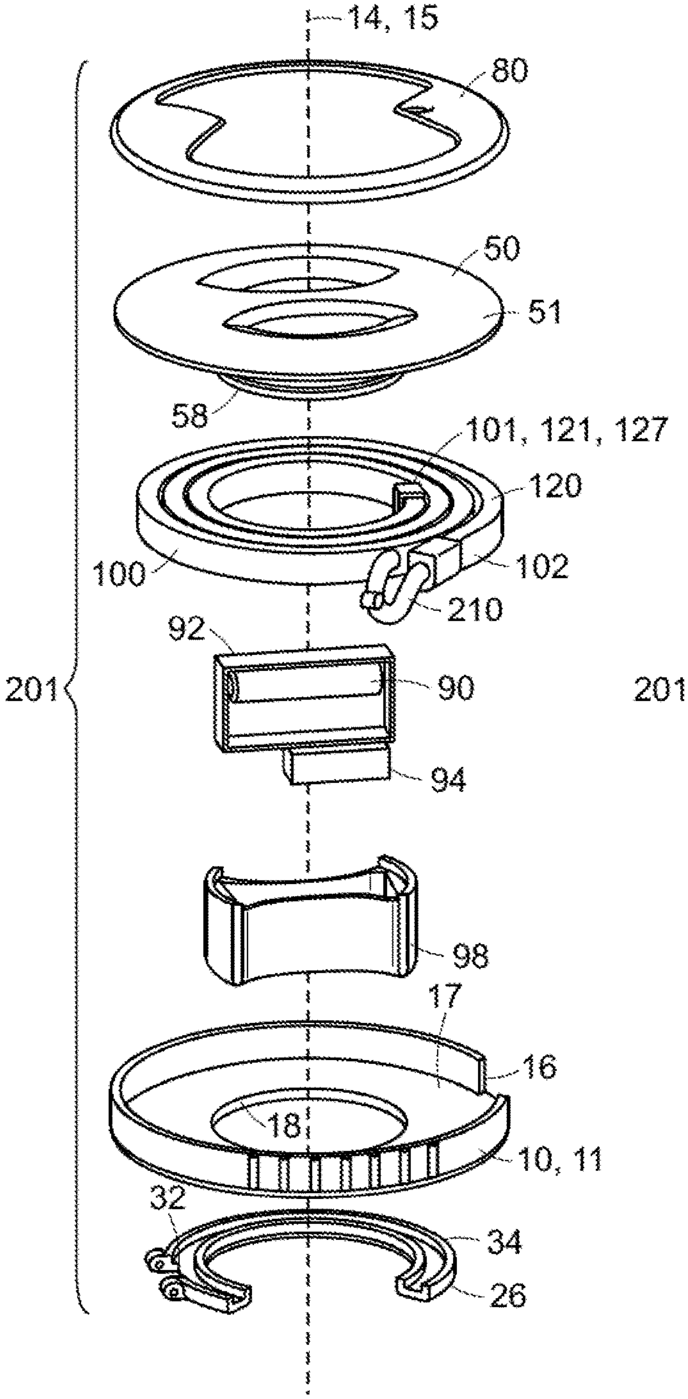
FIG. 8 is a front perspective exploded view of the lighting device of FIG. 3.
Figure 9:
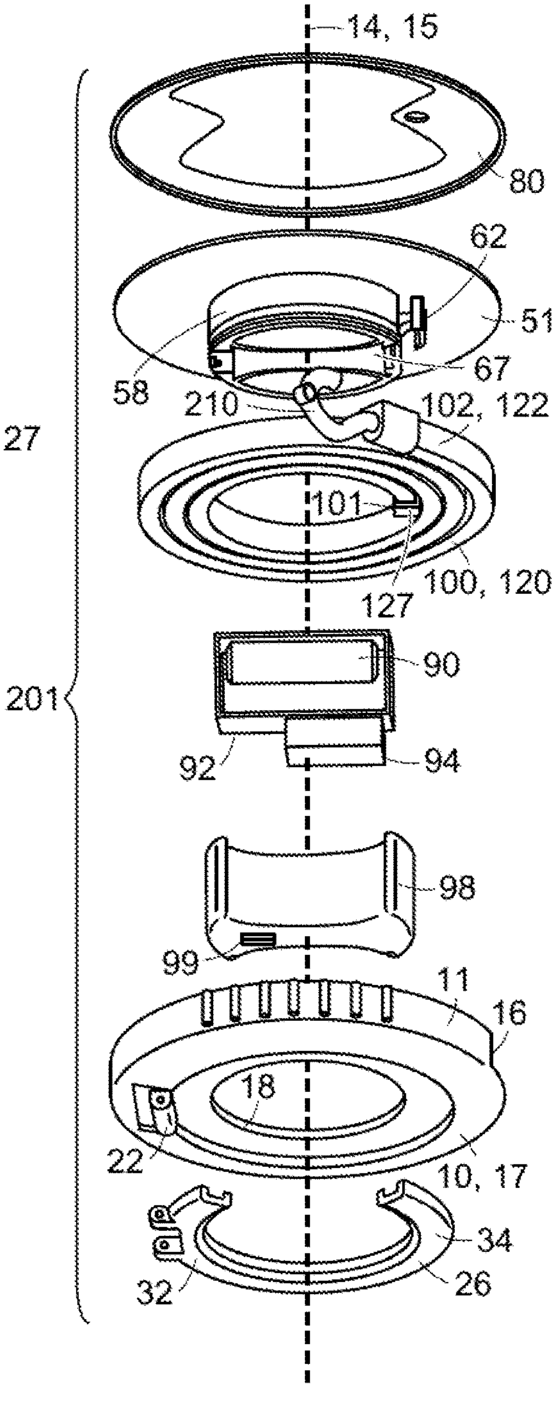
FIG. 9 is a rear perspective exploded view of the lighting device of FIG. 3.

At least portions of the jacket 120 are light transmissive. In some embodiments, for example, the jacket 120 may be formed a light transmissive and flexible material such as silicone, and all portions of the jacket 120 are light transmissive. In other embodiments, one pair of opposed sides of the jacket 120, for example the third and fourth sides 125, 126 of the jacket 120, are light transmissive while the other pair of opposed sides of the jacket 120, for example the first and second sides 123, 124 are opaque (FIG. 3). In still other embodiment, the first side 123 of the jacket 120 is light transmissive while the second, third and fourth sides 124, 125, 126 are opaque. In still other embodiments, the second side 124 of the jacket 120 is opaque, while the first, third and fourth sides are light transmissive. The light transmissive portions of the jacket 120 may be transparent or translucent, as required by the application. In some embodiments, the opaque portions of the jacket 120 may be made opaque by covering those portions with an opaque coating or an opaque overmold. In other embodiments, the opaque portions of the jacket 120 may be made opaque by material selection. That is, the light transmissive portions of the jacket 120 may be formed of a light transmissive material, while the opaque portions of the jacket 120 may be formed of an opaque material.

The flexible light assembly 100 is flexible. For example, the flexible light assembly 100 is sufficiently flexible to permit the assembly first end 101 to deflect relative to the assembly second end 102 about an axis perpendicular to the assembly centerline 103 and parallel to the width of the flexible light assembly 100 such that the assembly centerline 103 can assume a radius of curvature in a range of 1.3 centimeters to 10.2 centimeters. In the illustrated embodiment, the flexible light assembly 100 is sufficiently flexible to permit the assembly first end 101 to deflect relative to the assembly second end 102 about the axis 104 perpendicular to the assembly centerline 103 such that the assembly centerline 103 can assume a radius of curvature of 5.1 centimeters.

The jacket 120 protects the substrate 110 and light emitters 130 from the environment and may provide structural reinforcement to the substrate 110. In some embodiments, the jacket 120 may include embedded strengthening fibers or cords 129 to provide enhanced structural reinforcement of the substrate 110. The strengthening fibers or cords 129 may be randomly distributed and/or oriented or may be arranged or ordered within the jacket material in a way that optimizes desired strength properties.

In the illustrated embodiment, the jacket first end 121 may be closed by a cap 127 that is shaped and dimensioned to be received in the recesses 58(4), 62(1) provided in the flat 58(3) of the spool 58 and in the fence 62 that faces the flat 58(3). The cap 127 may include opening(s) (not shown) that receive electrical leads (not shown) that extend between the battery 90 and the substrate 110.

Figure 22:
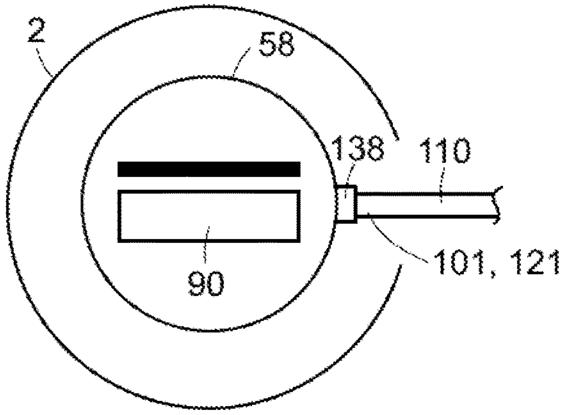
FIG. 22 is a schematic illustration of the housing illustrating swivel connection between the flexible light assembly and the spool, shown with the flexible light assembly in a first orientation.
Figure 23:
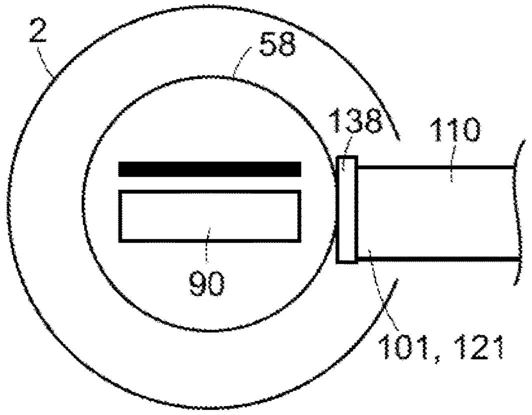
FIG. 23 is a schematic illustration of the housing illustrating swivel connection between the flexible light assembly and the spool, shown with the flexible light assembly in a second orientation.

Referring to FIGS. 22-23, in other embodiments, the jacket first end 121 may terminate in a swivel mount 138 that permits the flexible light assembly 100 to pivot about an axis parallel to the assembly centerline 103 relative to its connection point at the spool 58. This feature advantageously allows the flexible light assembly 100 to be rotated between a first orientation shown in FIG. 22 and a second orientation shown in FIG. 23. In FIGS. 22 and 23, the lighting device 1, 201 is shown in a schematic sectional view. In FIG. 22, a width direction of the flexible light assembly is parallel to an axial direction of the spool 58, permitting winding and unwinding of the flexible light assembly about the spool 58. In FIG. 23, the flexible light assembly 100 is rotated 90 degrees relative to that shown in FIG. 22. The ability to swivel permits light to be directed in a desired direction.

Referring again to FIGS. 1-3, the flexible light assembly second end 102 may terminate in a secondary light source, such as a spotlight 180. The spotlight 180 may be electrically connected to the battery 90 via the substrate 110. The spotlight 180 includes light emitters that may be LEDs or alternatively may be another type of light emitter such as, but not limited to, one or more incandescent bulbs. The spotlight 180 may by mechanically connected to the jacket second end 122 in such a way as to close the jacket second end 122. In addition, the spotlight 180 may by mechanically connected to the jacket second end 122 in such a way as to orient the light emitted from the spotlight 180 in a direction generally parallel to the flexible light assembly centerline 103. This can be compared to the direction of light emission from the primary light source (e.g., the flexible light assembly 100), which is generally perpendicular to the flexible light assembly centerline 103. In some embodiments, the quality, color and/or intensity of the light emitted by the spotlight 180 is different than that of the flexible light assembly 100. In some embodiments, the spotlight 180 may be configured to direct a narrow intense beam of light on a small area.

In the illustrated embodiment, the spotlight 180 is larger than the jacket second end 122 and the sidewall opening 16. By this configuration, the spotlight 180 is prevented from being retracted into the housing 2 and over-retraction of the flexible light assembly 100 is also prevented. In some embodiments, the housing sidewall 11 may include a recess 11(2) in the vicinity of the sidewall opening 16 that is sized and shaped to receive the spotlight 180. Thus, when the flexible light assembly 100 is fully retracted, the spotlight 180 resides in the sidewall recess 11(2), whereby the spotlight 180 is protected during storage and transportation, and whereby the outer surface of the housing 2 maintains a uniform appearance.

Referring again to FIGS. 4-5, 8-9 and 17-18, in an alternative embodiment lighting device 201, the flexible light assembly second end 102 may terminate in a mechanical connector 210 such as a rigid hook rather than a spotlight 180. All other elements of the lighting device 201 are as described above with respect to the lighting device 1, and common reference numbers are used to refer to common elements. The mechanical connector 210 may be used to mount the lighting device 201 to an external support structure such as a bracket, exposed nail, or cable. The mechanical connector 210 is not limited to being a hook and may be any alternative mechanical connector that can be used to suspend the lighting device 1 such as a closed ring, a clip, a carabiner, a spring hook, a magnet, a clamp, a pliable wire, etc., as required by the specific application. The mechanical connector 210 may be formed of an opaque material or a light transmissive material.

Figure 24:
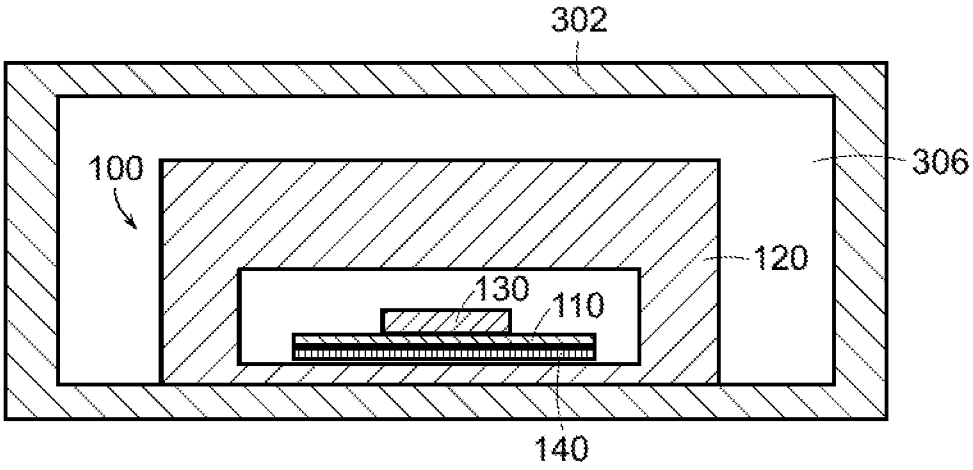
FIG. 24 is a cross-sectional view of another alternative lighting device.
Figure 25:
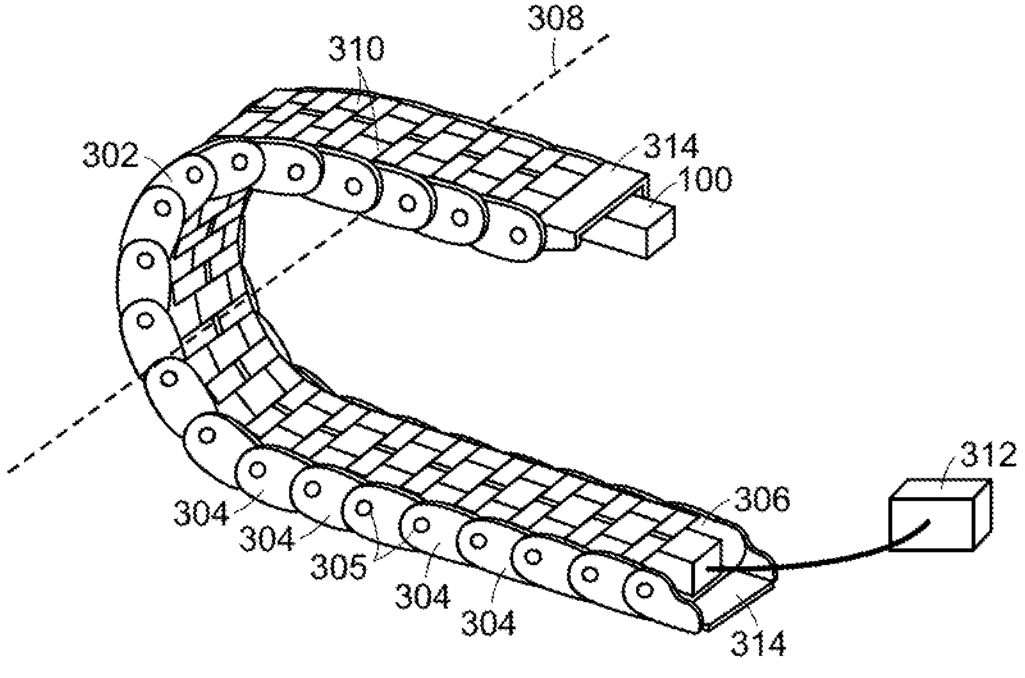
FIG. 25 is a front perspective view of the lighting device of FIG. 24.

Referring to FIGS. 24 and 25, another alternative lighting device 301 includes the flexible light assembly 100 described above, and common reference numbers are used to refer to common elements. The lighting device 301 differs from the lighting devices 1, 201 described in previous embodiments in that the disc-shaped housing 2 is omitted and replaced with an alternative housing 302. The housing 302 is elongated and flexible and provides support and protection to the flexible light assembly 100.

The housing 302 is a segmented and hinged assembly that bends about a single axis. In particular, the housing 302 includes individual hollow housing segments 304 that are serially connected to form an elongate, hollow chain-like structure. Each housing segment 304 connected via hinge pins 305 to the adjacent housing segments 304. In addition, the hollow interior space of each housing segment 304 communicates with the hollow space of the adjacent housing segments 304 to provide an interior passage 306 that extends along the length of the housing 302. The flexible light assembly is disposed in the interior passage 306. In some embodiments, each housing segment 304 is light transmissive. In other embodiments, each housing segment 304 is opaque, and includes an opening or window 310 (shown in FIG. 25) that permits light emitted from the flexible light assembly 100 to be emitted from the housing 302.

The housing segments 304 are hinged in parallel whereby the housing 302 is capable of bending about a single axis. In this embodiment, the housing 302 bends about a "folding" axis 308 that is parallel to the hinge pins 305 (e.g., the axis 308 is parallel to the width direction of the housing 302). The housing 302 including the serially-hinged housing segments 304 resists bending about the axes orthogonal to the folding axis 308 including twisting. In addition, the housing 302 including the serially-hinged housing segments 304 also resists tensile loads (e.g., loads in a direction parallel to the flexible light assembly centerline 103).

The lighting device 301 may include a power supply 312 that is electrically connected to one end of the housing 302. The power supply 312 may be hard-wired to the substrate 110 of the flexible light assembly 100, or alternatively may be detachably connected thereto.

The lighting device 301 may be operated in a bent (shown), coiled, partially coiled or extended (linearly arranged) configuration. In addition, the lighting device 301 be coiled for storage or convenient portability.

One or both ends of the housing 302 may terminate in mechanical connectors such as hooks, clamps, clips, mounting brackets 314 (shown), etc., Alternatively, one or both ends of the housing 302 may terminate in a secondary light source (not shown), such as a spotlight.

In the lighting device 1 described above with respect to FIGS. 1-23, the housing 2 includes a stator 10, and a rotor 50 that is rotatably supported on the stator 10. However, in some embodiments, a modified version of the rotor 50 may be employed that is fixed relative to the stator 10, and the flexible light assembly 100 may be manually wound about the spool 58. The modified rotor would still be light transmissible, whereby the housing 2 would provide an opaque side and a light-transmissible side in a manner similar to the embodiment illustrated in FIGS. 1-23.

In the housing 2 described above with respect to FIGS. 1-23, the stator 10 includes the annular foot 26 that serves as a stand. The foot 26 is not limited to having an annular shape. For example, in some embodiments, the foot 26 may have a partially annular shape that functions as a hook, whereby the foot 26 can serve both as a stand in some environments and a suspension device in other environments. In other embodiments, the foot may include a magnet to facilitate connection to external structures. In still other embodiments, the stator 10 itself may include a magnet to facilitate connection to external structures.

Selective illustrative embodiments of the lighting device are described above in some detail. It should be understood that only structures considered necessary for clarifying the lighting device have been described herein. Other conventional structures, and those of ancillary and auxiliary components of the lighting device, are assumed to be known and understood by those skilled in the art. Moreover, while working examples of the lighting device have been described above, the lighting device is not limited to the working examples described above, but various design alterations may be carried out without departing from the lighting device as set forth in the claims.

We claim:

1. A flexible light assembly comprising:

an assembly first end;

an assembly second end that is opposite the assembly first end;

an assembly centerline that extends between the assembly first end and the assembly second end;

an assembly thickness dimension;

an assembly width dimension that is measured in a direction perpendicular to the assembly thickness dimension;

an assembly length dimension that is measured in a direction parallel to the assembly centerline, the assembly length dimension being perpendicular to the assembly thickness dimension and the assembly width dimension, the assembly length dimension being at least ten times the assembly thickness dimension and the assembly width dimension;

a jacket, the jacket including a jacket first end that coincides with the assembly first end, a jacket second end that coincides with the assembly second end, and an internal vacancy that is elongated in a direction parallel to the assembly centerline;

a substrate that is elongated in a direction parallel to the assembly centerline, the substrate being disposed in the internal vacancy, the substrate being formed of a first material, the first material being at least as flexible as the jacket, the substrate including a substrate thickness dimension, a substrate width dimension that is measured in a direction perpendicular to the substrate thickness dimension, a substrate length dimension that is measured in a direction parallel to the assembly centerline, the substrate length dimension being perpendicular to the substrate thickness dimension and the substrate width dimension, the substrate length dimension being at least ten times the substrate thickness dimension and the substrate width dimension, a substrate first surface that is parallel to the substrate length dimension and the substrate width dimension, and a substrate second surface that is opposite the substrate first surface;

light emitters that are disposed on the substrate first surface, the light emitters being spaced apart in a direction parallel to the assembly centerline;

a reinforcing layer that is fixed to the substrate second surface and is formed of a second material, the second material having a greater tensile strength than the first material; and a superstructure that encloses the flexible light assembly, the superstructure including a first hollow segment and a second hollow segment that is serially connected to the first hollow segment via a hinge pin that extends in parallel to the width of the substrate, the second hollow segment being rotatable relative to the first hollow segment about the hinge gin, the assembly first end being disposed in the first hollow segment and the assembly second end being disposed in the second hollow segment, wherein the flexible light assembly is sufficiently flexible to permit the assembly first end to deflect relative to the assembly second end about an axis perpendicular to the assembly centerline such that the assembly centerline can assume a radius of curvature in a range of 1.3 centimeters to 10.2 centimeters.

2. The flexible light assembly of claim 1, wherein the jacket is formed of a third material that includes embedded reinforcing fibers.

3. The flexible light assembly of claim 1, wherein the jacket provides a waterproof enclosure for the substrate, the light emitters and the reinforcing layer.

4. The flexible light assembly of claim 1, wherein the jacket is formed of a third material that is light transmissive.

5. The flexible light assembly of claim 1, wherein the jacket includes light transmissive portions.

6. The flexible light assembly of claim 1, wherein the jacket is opaque in a direction perpendicular to the first and second surfaces and is light transmissive in a direction parallel to the first and second surfaces.

7. The flexible light assembly of claim 1, wherein the jacket is opaque in a direction parallel to the first and second surfaces and is light transmissive in a direction perpendicular to the first and second surfaces.

8. The flexible light assembly of claim 1, wherein the reinforcing layer is fixed to the second surface via an adhesive.

9. The flexible light assembly of claim 1, wherein the substrate is electrically conductive and is configured to provide an electrical connection between each light emitter and a power supply.

10. The flexible light assembly of claim 1, wherein the flexible light assembly is sufficiently flexible to permit the assembly first end to deflect relative to the assembly second end about an axis perpendicular to the assembly centerline such that the assembly centerline can assume a radius of curvature of 5.1 centimeters.

11. The flexible light assembly of claim 1, wherein the assembly second end terminates in a spotlight.

12. The flexible light assembly of claim 11, wherein the spotlight and the light emitters are powered by a common power supply via the substrate.

13. The flexible light assembly of claim 1, wherein the segments are light transmissible.

14. The flexible light assembly of claim 1, wherein each segment includes an opening that permits transmission of light therethrough.

15. A flexible light assembly comprising:

a light strip that includes an elongate substrate, and light emitters supported on a first surface of the substrate and powered by a power supply via the substrate, a reinforcing layer that is fixed to a second surface of the substrate, the reinforcing layer having a greater tensile strength than that of the substrate, a jacket that provides a waterproof enclosure for the light strip and the reinforcing layer, at least a portion of the light strip being one of translucent or transparent, and a superstructure that encloses the flexible light assembly, the superstructure including a first hollow segment and a second hollow segment that is serially connected to the first hollow segment via a hinge pin that extends in parallel to the width of the substrate, the second hollow segment being rotatable relative to the first hollow segment about the hinge pin, the assembly first end being disposed in the first hollow segment and the assembly second end being disposed in the second hollow segment, wherein the flexible light assembly is sufficiently flexible to permit a first end of the jacket to deflect relative to a second end of the jacket about an axis that is parallel to the first surface of the substrate such that the flexible light assembly can assume a radius of curvature in a range of 1.3 centimeters to 10.2 centimeters.

16. The flexible light assembly of claim 15, wherein the jacket is formed of a fiber-reinforced silicone.

17. The flexible light assembly of claim 15, wherein one end of the flexible light assembly includes a hook.

18. The flexible light assembly of claim 15, wherein one end of the flexible light assembly includes a light source.

* * * * *